United States Patent
Abbad et al.

(10) Patent No.: US 9,540,903 B2
(45) Date of Patent: Jan. 10, 2017

(54) MIXING AND INJECTING FIBER-BASED STIMULATION FLUIDS

(71) Applicant: Schlumberger Technology Corporation, Sugar Land, TX (US)

(72) Inventors: Mustapha Abbad, Al-Khobar (SA); Stephen John Remane Dyer, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/516,574

(22) Filed: Oct. 16, 2014

(65) Prior Publication Data
US 2016/0108697 A1 Apr. 21, 2016

(51) Int. Cl.
| | | |
|---|---|---|
| E21B 33/13 | (2006.01) |
| E21B 43/04 | (2006.01) |
| E21B 33/138 | (2006.01) |
| E21B 17/00 | (2006.01) |
| E21B 33/12 | (2006.01) |

(Continued)

(52) U.S. Cl.
CPC ............ *E21B 33/138* (2013.01); *E21B 17/00* (2013.01); *E21B 21/003* (2013.01); *E21B 21/062* (2013.01); *E21B 33/12* (2013.01); *E21B 34/06* (2013.01); *E21B 41/0078* (2013.01); *E21B 43/04* (2013.01); *E21B 2034/007* (2013.01)

(58) Field of Classification Search
CPC ..... C09K 8/80; C09K 2208/08; E21B 43/267; E21B 43/04; E21B 43/26; E21B 33/138; E21B 21/003; E21B 33/14; E21B 43/08; E21B 33/13; E21B 37/00; E21B 17/203
See application file for complete search history.

(56) References Cited

U.S. PATENT DOCUMENTS

| 4,664,528 A | 5/1987 | Rodgers et al. |
| 2003/0081493 A1 | 5/2003 | Allen |

(Continued)

FOREIGN PATENT DOCUMENTS

WO 2013074878 A1 5/2013

OTHER PUBLICATIONS

International Search Report for corresponding PCT Application Serial No. PCT/US2015/055200, dated Jan. 21, 2016, 3 pages.

*Primary Examiner* — Zakiya W Bates
(74) *Attorney, Agent, or Firm* — Bridget M. Laffey; Jakub Michna; Daniel S. Matthews

(57) ABSTRACT

An emulsion is mixed with fibers while the emulsion is moving through a surface tubing using a venturi. The fiber/emulsion mixture is injected into a pressurized tank and the pressurized fiber/emulsion mixture is injected from the pressurized tank into a desired location in a wellbore. Pumps and pressure boosters may be used to move the fluid. Alternatively, an emulsion and a fiber suspension is provided and a first downhole tubing disposed in a wellbore conveys the emulsion downhole while a second downhole tubing disposed in the wellbore and circumferentially enclosing all or part of the first downhole tubing conveys the fiber suspension downhole. The first downhole tubing has nozzles through which the emulsion passes into the second downhole tubing and the emulsion and the fiber suspension mix. The mixture exits the second downhole tubing through ports at a desired location in the wellbore.

14 Claims, 6 Drawing Sheets

(51) Int. Cl.
*E21B 34/06* (2006.01)
*E21B 41/00* (2006.01)
*E21B 21/00* (2006.01)
*E21B 21/06* (2006.01)
*E21B 34/00* (2006.01)

(56) References Cited

U.S. PATENT DOCUMENTS

| | | |
|---|---|---|
| 2007/0144739 A1 | 6/2007 | Fitzgerald |
| 2010/0184631 A1* | 7/2010 | Turner ............... C09K 8/40 507/219 |
| 2011/0272156 A1 | 11/2011 | Johnson, Sr. |
| 2014/0014344 A1* | 1/2014 | Daussin ............ E21B 43/25 166/305.1 |
| 2014/0054039 A1 | 2/2014 | Chang et al. |
| 2015/0075272 A1 | 3/2015 | Abbad et al. |

\* cited by examiner

MIXING AND INJECTING FIBER-BASED STIMULATION FLUIDS

BACKGROUND

Upstream oil field exploration and production operations, including drilling, completion, stimulation, water injection, and other liquid and gas injection processes, often require using chemical and solid materials to temporarily seal off very high permeability rocks (commonly called "thief zones"). In drilling and completion, sealing off thief zones prevents lost circulation of drilling and completion fluids. In stimulation and other production and recovery enhancing processes, stopping loss to thief zones improves the uniformity of the injected stimulation fluid entering the formations along the trajectory of the wellbore, leading to improved hydrocarbon production and recovery. Efficient plugging of the thief zones optimizes the short term and maximizes the long term economy of the hydrocarbon extraction from the subterranean formations. If not properly designed, however, the materials injected into the well could fail to seal the thief zones, or, worse, they could damage the formation permeability such that the reservoir could become non-productive.

To create strong and temporary plugs, viscous fluids containing degradable fibers and/or solid particles are mixed by surface equipment prior to their injection. The fibers and/or particles are expected to interact with one another and form flocs and/or clusters to plug high permeability zones and fractures. The fiber flocculation and the particle coagulation are known to be highly sensitive to the viscosity of the carrying fluid, the injection rate, and the concentrations of certain additives. The quality control of the resulting mixture is done by visual inspection on the surface. However, when injected into the formation, the operator has no indication about the interaction of the dispersed phase, even though it is a very important condition for efficient placement of the treatment fluid. Indeed, an early flocculation/coagulation will plug surface or downhole equipment and a late one will result in an unsuccessful fluid placement.

There currently are two primary methods to inject fibers downhole to reduce or eliminate fluid loss to a thief zone. One, called "batch" mixing and shown in FIG. 1, mixes the fibers with the base fluid prior to injection using an appropriate mixer and then injects the mixture into the well with a high pressure pump. The other method, known as "on-the-fly" mixing and shown in FIG. 2, mixes while performing the fluid injection by feeding the fiber into the flow stream, by using a venturi to suck the fiber from the feeder into the flow stream tubing.

SUMMARY

An emulsion is mixed with fibers while the emulsion is moving through a surface tubing using a venturi. The fiber/emulsion mixture is injected into a pressurized tank and the pressurized fiber/emulsion mixture is injected from the pressurized tank into a desired location in a wellbore. Pumps and pressure boosters may be used to move the fluid. Alternatively, an emulsion and a fiber suspension is provided and a first downhole tubing disposed in a wellbore conveys the emulsion downhole while a second downhole tubing disposed in the wellbore and circumferentially enclosing all or part of the first downhole tubing conveys the fiber suspension downhole. The first downhole tubing has nozzles through which the emulsion passes into the second downhole tubing and the emulsion and the fiber suspension mix. The mixture exits the second downhole tubing through ports at a desired location in the wellbore.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

DETAILED DESCRIPTION

Figure 1:
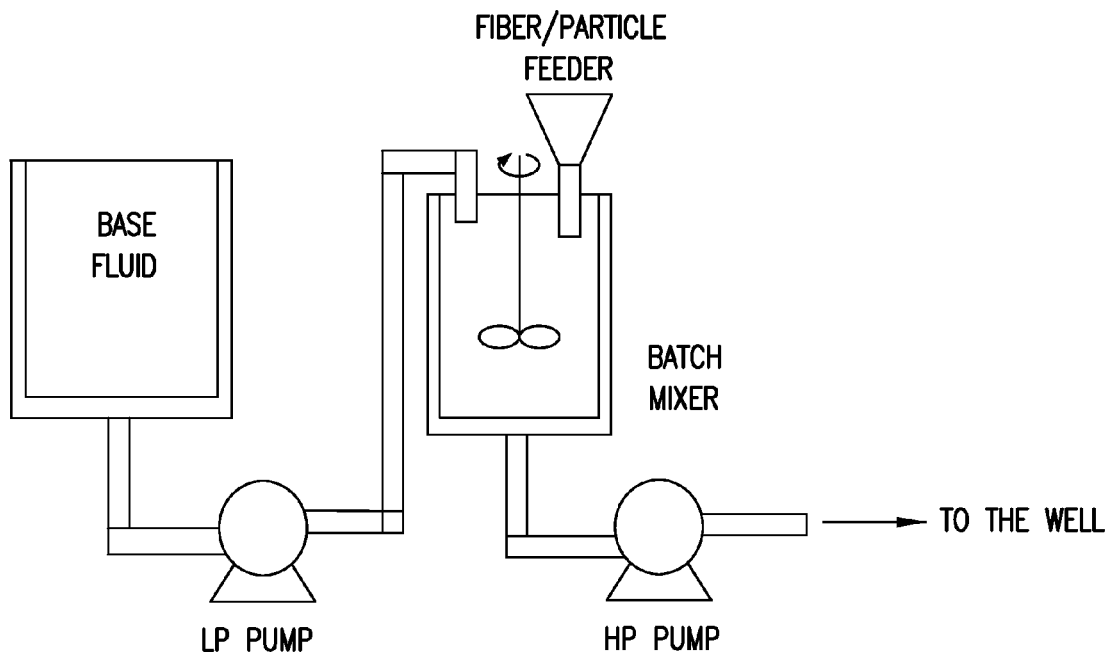
FIG. 1 is a schematic drawing of one embodiment of a prior art apparatus used for "batch" mixing.
Figure 2:
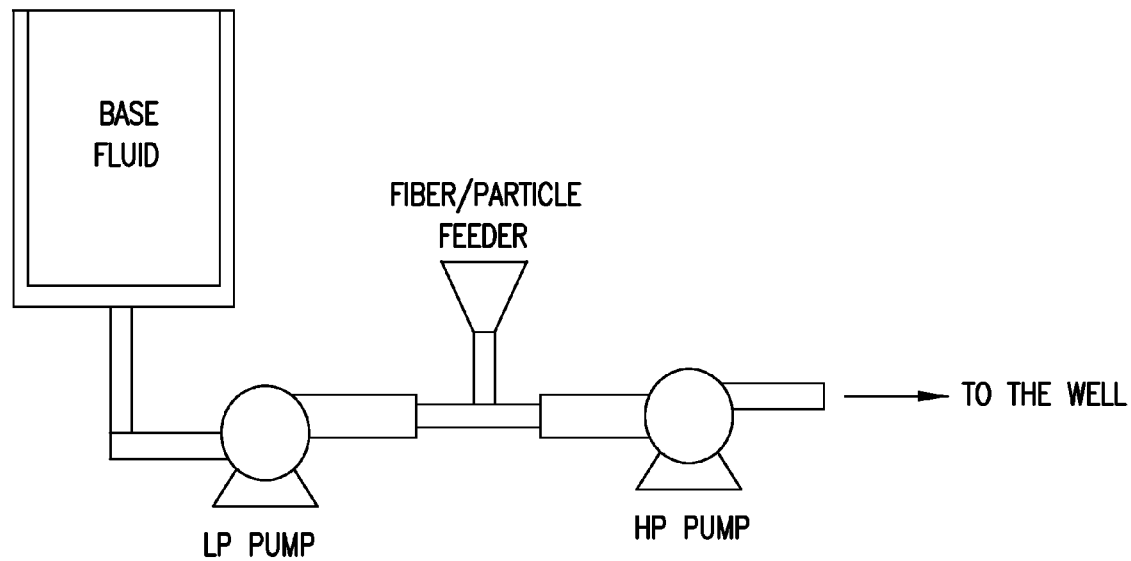
FIG. 2 is a schematic drawing of one embodiment of a prior art apparatus used for "on-the-fly" mixing.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event.]" or "in response to detecting [the stated condition or event]," depending on the context.

A system and method to mix and inject fiber-based stimulation fluids is disclosed. One may mix fibers in a water-in-oil or an oil-in-water emulsion to have a better bridging (or diverting) efficiency against a high permeability formation, fracture, or aperture. This is due to the high flocculation rate of fiber in emulsion compared to currently used base fluids. However, with the current mixing practices, injecting fibers with an emulsion presents a safety risk. Indeed, the pressure required to inject stimulation fluids is on the order of 3-5 Kpsi for matrix acidizing and 10-15 Kpsi for hydraulic fracturing. If one or more fiber flocs gets trapped in a pump, at a flow restriction, or elsewhere in the confined flow stream, a large pressure buildup may be generated that might damage the equipment and risk loss of life or personal injury. To have an efficient diverting process without such a safety problem, alternative mixing solutions may be used, either at the surface or performed and monitored downhole.

Figure 3:
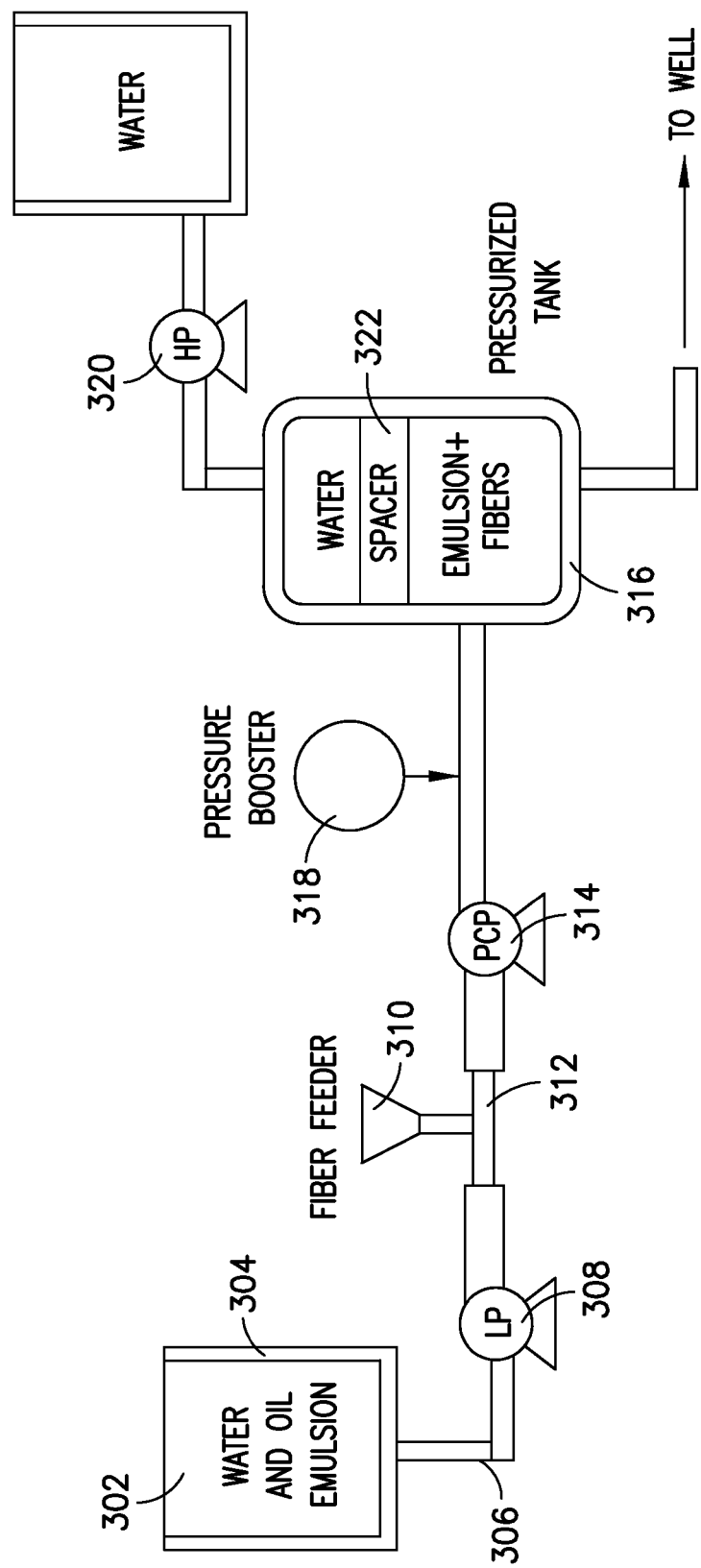
FIG. 3 is a schematic drawing of one embodiment of a surface apparatus to form and deliver a fiber/emulsion mixture to a wellbore, in accordance with the present disclosure.

FIG. 3 shows an oil/water emulsion 302 being circulated from a storage tank 304 through tubing 306 using a low pressure pump (LP) 308. Fibers are introduced through a fiber feeder 310 using a venturi 312. The mixture of fiber and emulsion is circulated with, for example, a progressive cavity pump (PCP) 314 to a pressurized tank 316. The pressure delivered by the PCP 314 may or may not be enough for a hydraulic fracturing job. If not, a pressure booster 318 may be used. In the embodiment shown, the injection of the mixture into the well is done by injecting a diversion fluid (e.g. water) with a high pressure pump (HP) 320 into the pressurized tank 316. This may be done if the volume of the pressurized tank 316 is sufficient to accommodate the diversion fluid. To avoid mixing the injected diversion fluid with the fiber/emulsion mixture, a spacer 322 can be used to separate the two fluids. If in another embodiment pressurized tank 316 cannot accommodate the diversion fluid, pressure may be bled off to allow the PCP to fill pressurized tank 316 with the fiber/emulsion mixture, and then the PCP may be isolated and the high pressure pump 320 used for downhole injection.

Figure 4:
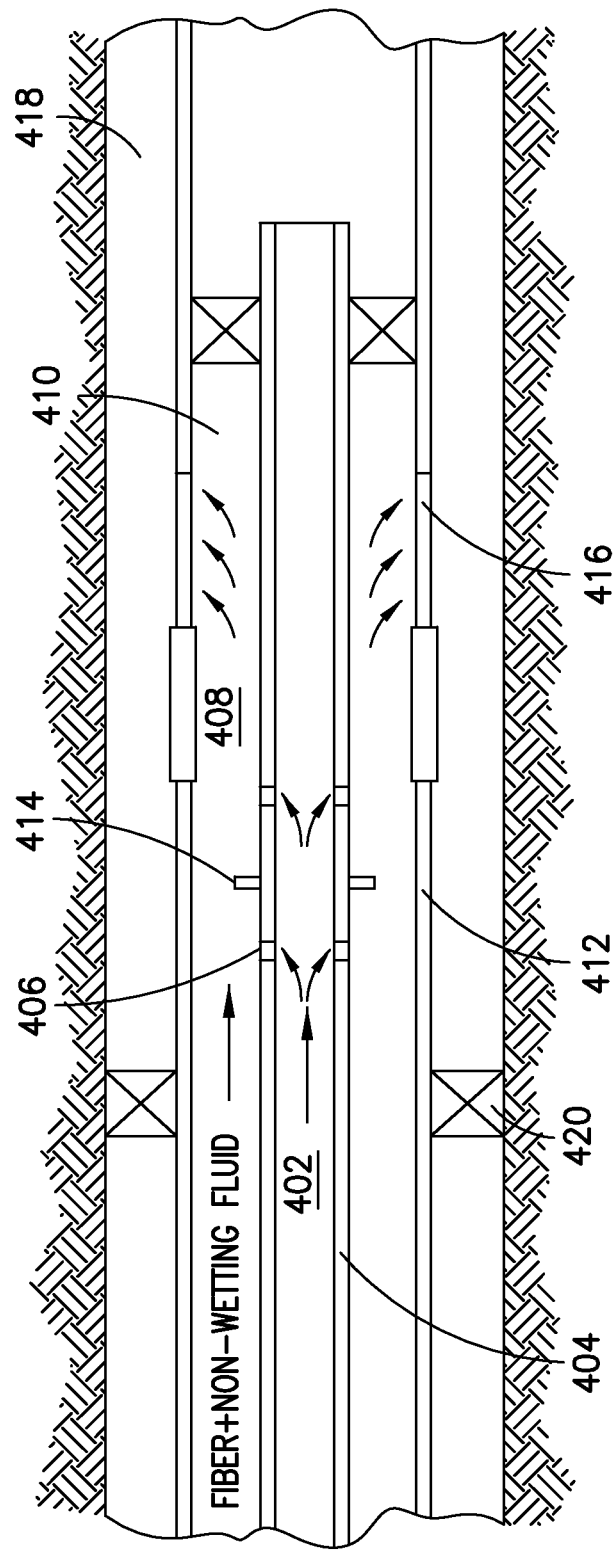
FIG. 4 is a schematic drawing of one embodiment of a downhole apparatus to form and deliver a fiber/emulsion mixture to a wellbore, in accordance with the present disclosure.

FIG. 4 shows a downhole apparatus that conveys an (diluted) emulsion 402 downhole using coil tubing 404. The emulsion 402 ultimately exits through one or more nozzles 406. Fibers 408, carried by a (non-wetting) fluid, are similarly delivered downhole via an inner annular space 410 between coil tubing 404 and a mixing tubing 412 that circumferentially surrounds coil tubing 404. Mixing tubing 412 may be, for example, production tubing. Alternatively, mixing tubing 412 may be omitted entirely and the annulus of the wellbore (i.e., the annular space between the coil tubing 404 and the wellbore wall or casing) may be used to convey fibers 408 and serve as the mixing chamber for fibers 408 and emulsion 402. Fibers 408 are carried by non-wetting fluid to prevent premature flocculation which could lead to the plugging of inner annulus 410. Nozzle 406 may be designed to provide turbulence-induced mixing when emulsion 402 exits nozzle 406 and enters the flow stream of the fluid carrying fibers 408. If mixing tubing 412 is casing, the ultimate exit ports would generally be casing perforations that open into perforation tunnels in the formation.

Mixing can also be enhanced by increasing the injection rate of the emulsion 402 into the inner annulus 410. The quality of the mixture near a target zone may be checked by a mixing control probe 414 such as a dielectric or capacitance probe. Based on information obtained using probe 414, the quality and composition of the mixed fluid can be tailored on-the-fly by an operator monitoring from the surface. If the quality of the mixture is satisfactory, it will exit the inner annular space 410 through an operator-controlled opening 416, which can be, for example, a hydraulic or electric valve (e.g., a sliding sleeve). The mixture passes into an outer annulus 418 (between the wellbore wall or casing and the mixing tubing 412) and into the surrounding formation. Packers 420 may be used in any of the annular spaces 410, 418 (i.e., inner and/or outer) to partition those annular spaces 410, 418.

One way to control the extent of mixing and the level of turbulence is to add a throttling valve or variable choke to nozzle 406. The level of choking or throttling can be controlled, for example, by an electrical or hydraulic line (not shown) from the surface that runs through coiled tubing 404, or by utilizing pressure pulses in the fluid (emulsion 402) in coil tubing 404 to communicate with a battery-operated, electrical solenoid valve (or other selectably sealable opening) downhole. The solenoid valve can selectively control the amount of fluid pressure applied to a sleeve that variably covers nozzle 406, creating selectable variance in the size and/or numbers of nozzles open to flow.

Figure 5:
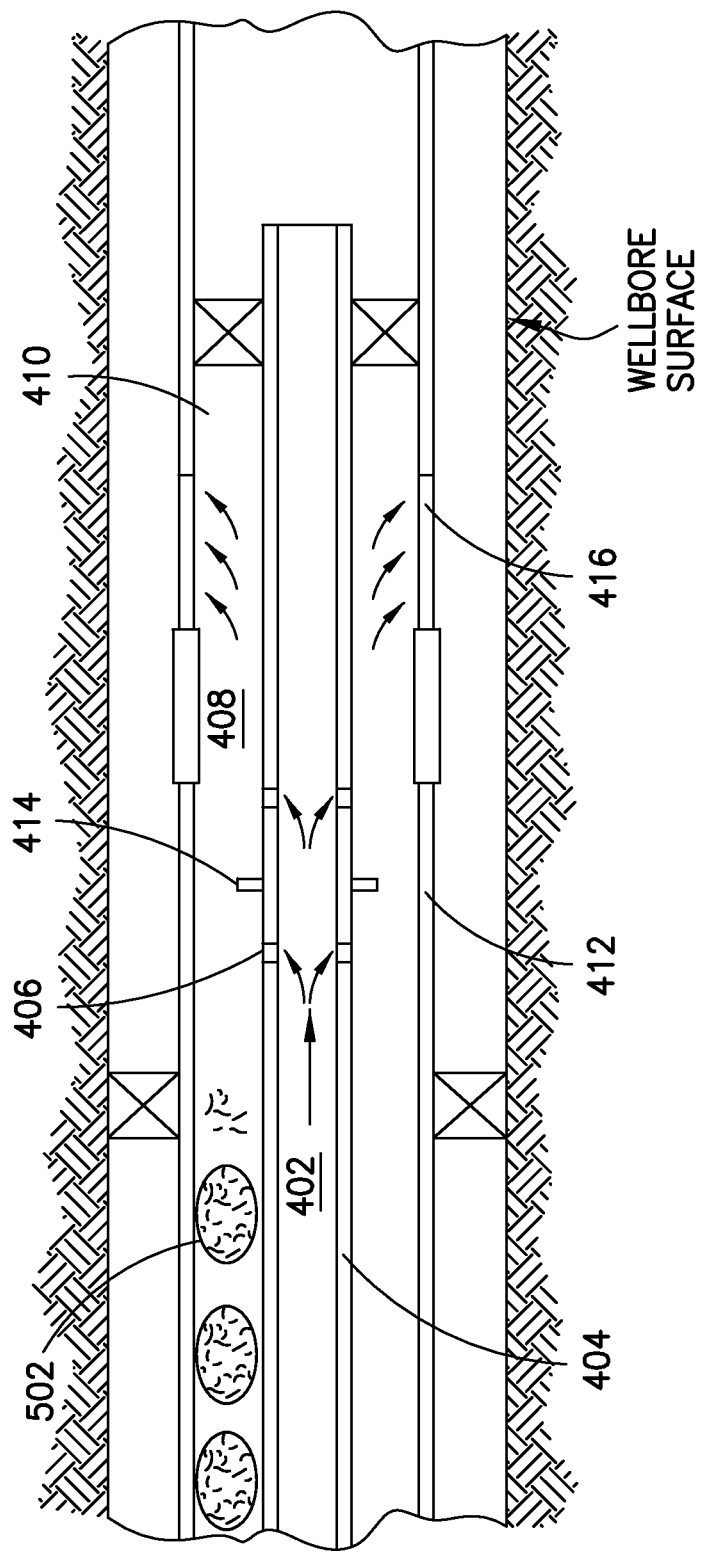
FIG. 5 is a schematic drawing of an alternative embodiment of a downhole apparatus to form and deliver a fiber/emulsion mixture to a wellbore, in accordance with the present disclosure.
Figure 6:
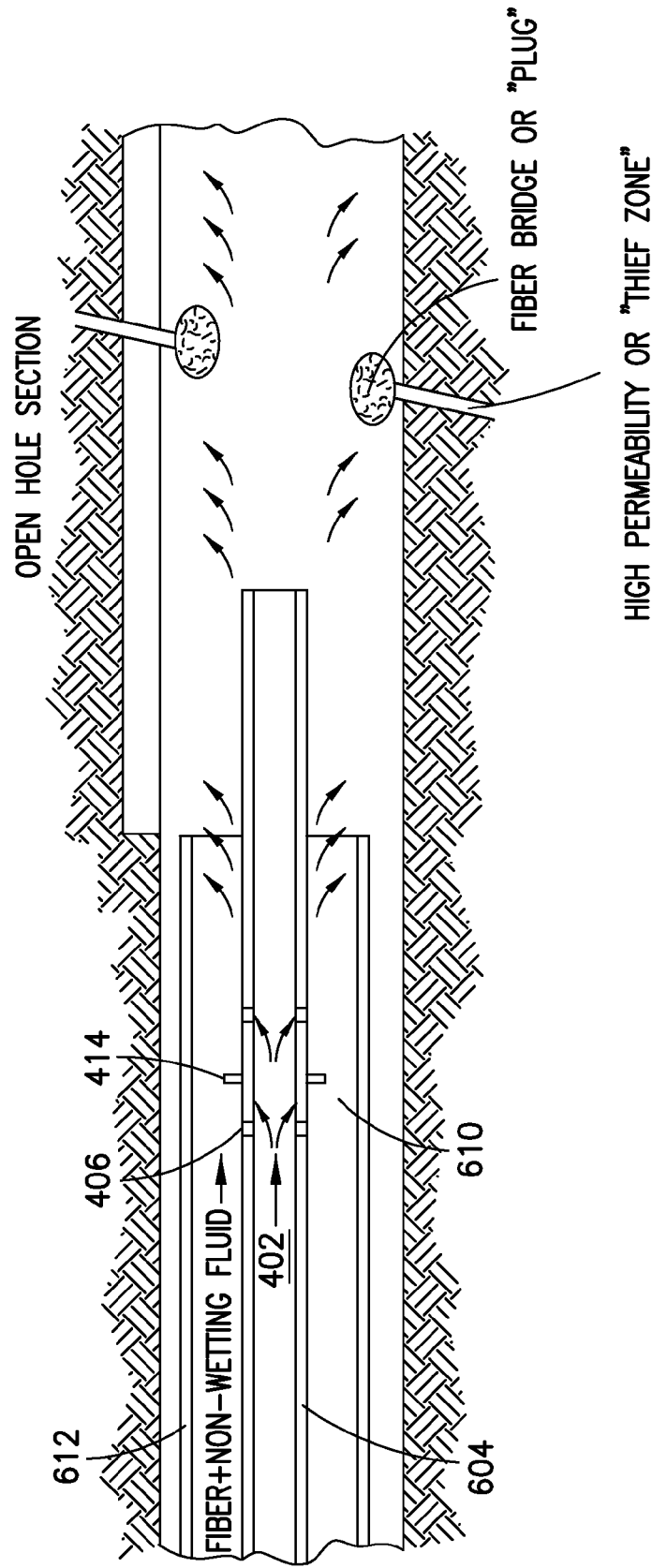
FIG. 6 is a schematic drawing of an alternate embodiment of a downhole apparatus to form and deliver a fiber/emulsion mixture to a wellbore, in accordance with the present disclosure.

In an alternative embodiment shown in FIG. 5, fibers 408 are introduced into the annulus space 410 encapsulated inside a degradable material 502 that can free the fibers near the target zone using various triggering means, such as reactive chemicals or temperature. Chemicals can be introduced directly into a desired downhole location by a chemical injection line (not shown) run from the surface through the coiled tubing (similar to control line above). The chemical composition can be controlled at the surface depending on the quality of the fluid downhole as measured by the electric control probe 414.

A similar downhole architecture could be provided for drilling applications or where there is a partially completed and partially uncompleted (i.e., open hole) wellbore. A drill bit has pre-defined nozzles for fluid circulation. In addition, separate circulation control devices are available. These could be used in a manner similar to that described in the text associated with FIG. 4, but applied to drilling fluid loss control. In this case, the annulus 610 between drill pipe 604 and casing (or liner) 612 could be used to convey the fiber 408 and non-wetting fluid, and the drill pipe 604 itself used to convey the emulsion 402. Mixing of the two fluids downhole would allow the fiber plug to be properly spotted at the leak-off position in the wellbore. A fiber plug could then provide a platform for other, perhaps more permanent, loss control materials such as polymers, resins, or even cement, allowing drilling operations to continue thereafter.

Figure 7:
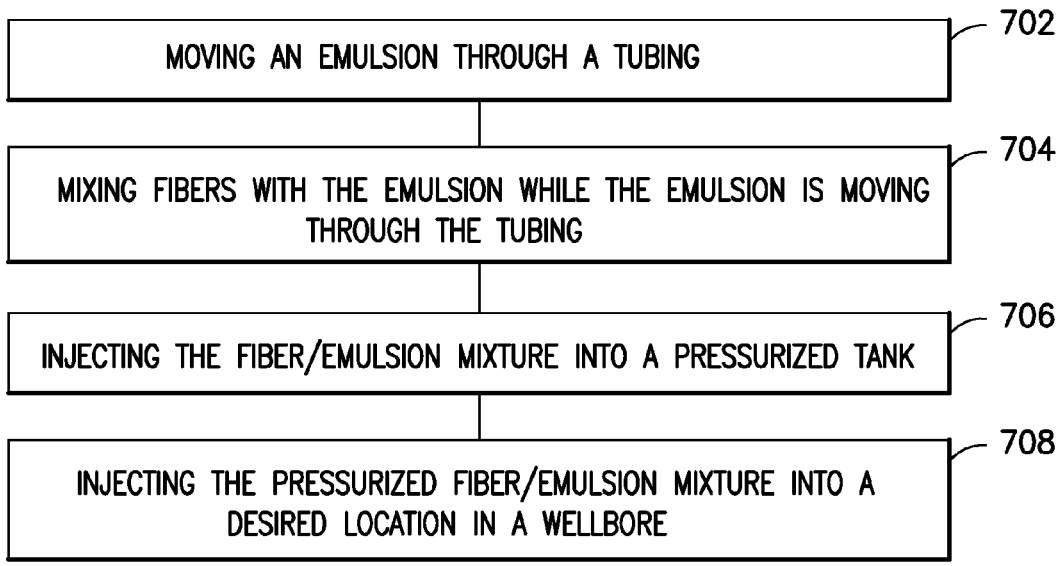
FIG. 7 is a workflow showing one embodiment of mixing and injecting fiber-based stimulation fluids, in accordance with the present disclosure.
Figure 8:
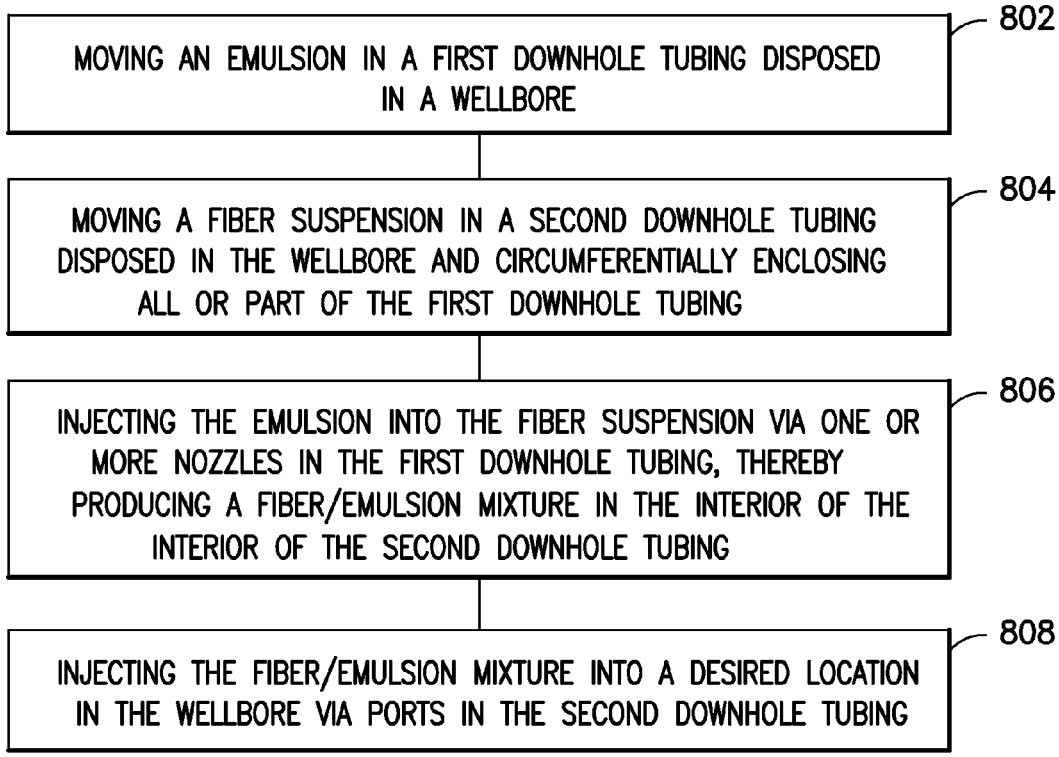
FIG. 8 is a workflow showing an alternative embodiment of mixing and injecting fiber-based stimulation fluids, in accordance with the present disclosure.

FIG. 7 is a flow chart showing one embodiment of mixing and injecting fiber-based stimulation fluids. An emulsion is moved through a tubing (702). Fibers are mixed with the emulsion while the emulsion is moving through the tubing (704). The fiber/emulsion mixture is injecting into a pressurized tank (706) and the pressurized fiber/emulsion mixture is injected into a desired location in a wellbore (708). FIG. 8 is a flow chart showing an alternative embodiment of mixing and injecting fiber-based stimulation fluids. An emulsion is moved in a first downhole tubing disposed in a wellbore (802). A fiber suspension is moved in a second downhole tubing disposed in the wellbore and circumferentially enclosing all or part of the first downhole tubing (804). The emulsion is injected into the fiber suspension via one or more nozzles in the first downhole tubing, thereby producing a fiber/emulsion mixture in the interior of the second downhole tubing (806). The fiber/emulsion mixture is injected into a desired location in the wellbore via ports in the second downhole tubing (808).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An apparatus, comprising:
   a source of emulsion and a source of a fiber suspension;
   a first downhole tubing disposed in a wellbore to convey the emulsion, the first downhole tubing having one or more nozzles configured to provide turbulence-induced mixing; and
   a second downhole tubing disposed in the wellbore and circumferentially enclosing all or part of the first downhole tubing to convey the fiber suspension, the second downhole tubing having one or more ports;
   wherein the emulsion and the fiber suspension are mixed within the interior of the second downhole tubing.

2. The apparatus of claim 1, wherein the second downhole tubing is selected from the group consisting of customized mixing tubing, production tubing, liners, and casing.

3. The apparatus of claim 1, wherein the emulsion is an oil/water or a water/oil emulsion and the fiber in the fiber suspension is suspended in a non-wetting fluid.

4. The apparatus of claim 1, wherein the first downhole tubing is selected from the group consisting of coil tubing, drill pipe, and production tubing.

5. The apparatus of claim 1, wherein the one or more nozzles provide fluid communication between the first downhole tubing and the second downhole tubing.

6. The apparatus of claim 5, wherein the one or more nozzles provide turbulence-induced mixing of the emulsion and the fiber suspension within the interior of the second downhole tubing.

7. The apparatus of claim 1, wherein the one or more nozzles further comprise a variable choke.

8. The apparatus of claim 1, wherein the one or more ports provide fluid communication between the second downhole tubing and an annulus of the wellbore or the second downhole tubing and a surrounding formation.

9. The apparatus of claim 1, wherein the one or more ports may be selectably opened and/or closed.

10. The apparatus of claim 9, wherein the opening or closing of the one or more ports is controlled using a device selected from the group consisting of a hydraulic valve, an electric valve, and a sliding sleeve.

11. The apparatus of claim 1, further comprising a control probe.

12. The apparatus of claim 11, wherein the control probe is selected from the group consisting of a dielectric probe, a capacitance probe, and a resistivity probe.

13. The apparatus of claim 1, wherein the fibers in the fiber suspension are encapsulated in a degradable material.

14. The apparatus of claim 1, further comprising one or more packers in sealing engagement with the first downhole tubing and the second downhole tubing or the second downhole tubing and the wellbore wall.

* * * * *